US005212807A

United States Patent [19]

Chan

[11] Patent Number: 5,212,807

[45] Date of Patent: May 18, 1993

[54] METHOD OF AUTOMATIC PATH MAP GENERATION FOR SIMULCAST TRANSMISSION SYSTEM

[75] Inventor: Hang K. Chan, Bartlett, Ill.

[73] Assignee: Motorola, Inc., Schaumburg, Ill.

[21] Appl. No.: 678,878

[22] Filed: Mar. 28, 1991

[51] Int. Cl.[5] .............. H04Q 7/00

[52] U.S. Cl. .............. 455/33.4; 455/51.2; 455/67.6

[58] Field of Search .............. 455/33, 51, 54, 56, 455/67, 33.1, 33.4, 51.1, 51.2, 54.1, 56.1, 67.1, 67.6

[56] References Cited

U.S. PATENT DOCUMENTS

| | | | |
|---|---|---|---|
| 4,188,582 | 2/1980 | Cannalte et al. . | |
| 4,255,814 | 3/1981 | Osborn . | |
| 4,475,246 | 10/1984 | Batlivala et al. . | |
| 4,578,815 | 3/1986 | Persinotti . | |
| 4,696,051 | 9/1987 | Breeden . | |
| 4,696,052 | 9/1987 | Breeden . | |
| 5,014,344 | 5/1991 | Goldberg | 455/56 |
| 5,038,403 | 8/1991 | Leitch | 455/51 |
| 5,055,851 | 10/1991 | Sheffer | 455/54 |
| 5,058,200 | 10/1991 | Huang et al. | 455/54 |

OTHER PUBLICATIONS

"Automatic Microwave Loopswitch Detection Method for Simulcast Communication System", Motorola Technical Developments, vol. 11, Oct. 1990, pp. 48–49—Davis et al.—discloses the use of a pilot tone methodology to detect link failure conditions in a simulcast system. The remote site loop pilot detect and loop masters switches indicators interface into a simulcast parameter adjustment device.

"The Loop Microwave System", Motorola Technical Note No. R03810, 1978,—Thomas—discloses an overview of loop microwave communication systems, particularly addressing alternate route controlling schemes and their benefit.

*Primary Examiner*—Reinhard J. Eisenzopf
*Assistant Examiner*—Edward Urban
*Attorney, Agent, or Firm*—James A. Coffing; Joseph P. Krause

[57] ABSTRACT

A method of automatic path map generation (600) for use in a simulcast transmission system is disclosed which has at least three transmitter sites which form a first communication loop (403). The first communication loop has at least a first and a second audio path. A first audio path originates from a primary transmitter site (402), passes first through a first transmitter site, and ends at a second transmitter site. A second audio path originates from the primary site (402), passes first through the second transmitter site, and ends at the first transmitter site. The first audio path is associated with a first path condition, and the second audio path is associated with a second path condition. The method employed includes establishing (601) a logical representation of the simulcast transmission system. Then, selecting (605) one of the at least three transmitter sites for which a path map is to be generated, determines (902) a logical relationship between the primary transmitter site (402) and the selected transmitter site. Knowing this, the primary site (402) is able to calculate (708) a data set identification (ID) for the selected transmitter site that is associated with each of at least the first and the second path conditions. These data set IDs are then recorded (918) for the selected transmitter site, to produce a path map describing a unique association between each of at least the first and the second path conditions and the data set ID.

3 Claims, 8 Drawing Sheets

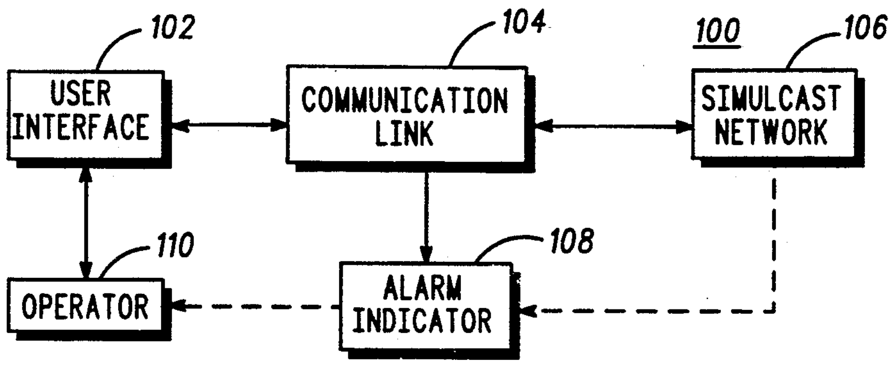
FIG. 1A — PRIOR ART —
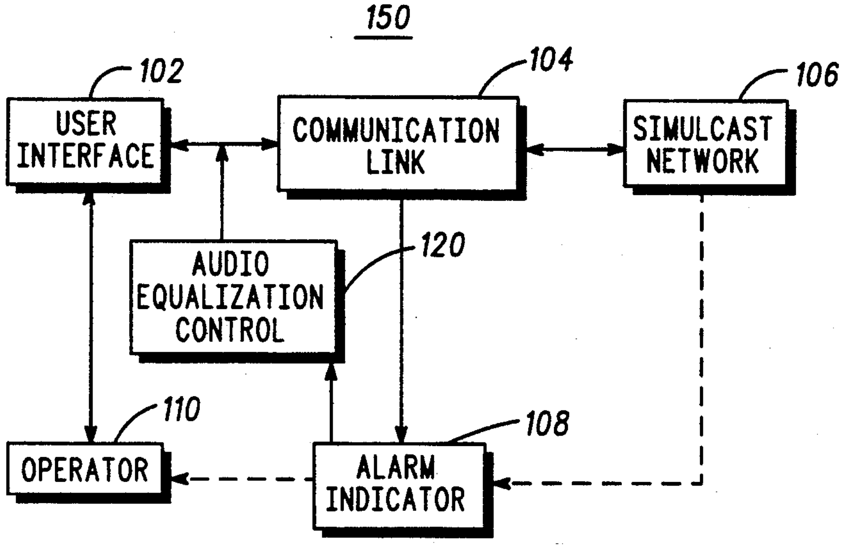
FIG. 1B
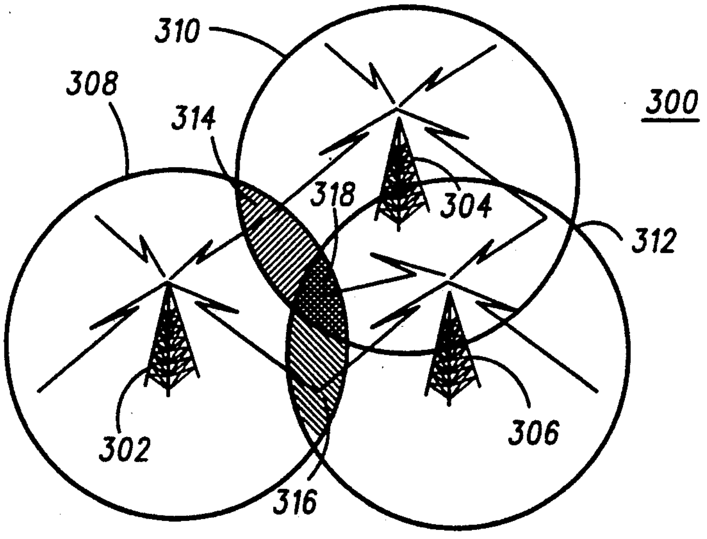
FIG. 3 — PRIOR ART —

METHOD OF AUTOMATIC PATH MAP GENERATION FOR SIMULCAST TRANSMISSION SYSTEM

FIELD OF THE INVENTION

The present invention relates generally to simulcast transmission systems, and more particularly to a simulcast transmission system having automatic path map generation capabilities. Reference is made to U.S. Pat. No. 5,155,859 "Simulcast Transmission System Having Automatic Audio Equalization", filed on behalf of Harris et al. on the same date herewith, assigned to the assignee of the present invention, and containing material which may be related to the present invention.

BACKGROUND OF THE INVENTION

The purpose of a simulcast transmission system is to achieve wide area radio frequency (RF) coverage of a single frequency by simultaneous transmission from multiple geographical locations. Multiple transmitter sites are geographically located in such a way as to provide overlapping RF coverage, thus providing continuous signal reception over the combined coverage area for these transmitter sites. In order for a received simulcast signal to be intelligible, the remote site transmitters must all be modulated with substantially the same signal at substantially the same point in time. Typical industry standards for controlling modulation signals to the transmitters sites are ±0.1 dB amplitude stability, and ±2.5 microseconds signal delay. Due to these strict system requirements, the infrastructure of the simulcast transmission system between the transmitter sites must be carefully designed.

A common design methodology used for this infrastructure is a loop configuration. The loop configuration allows failure of a single link anywhere in the loop while maintaining continuity to all transmitter sites. When a loop system detects the failure of a link and redirects the loop to resolve continuity, the signal delay to some or all of the transmitter sites may be altered. As mentioned previously, the delays difference must be maintained to within ±2.5 microseconds for proper operation, highlighting the need for nearly instantaneous detection of changes in the system.

Loop microwave systems are designed with alarm units at each site which typically report the status of the microwave to a master alarm unit. Previous technology in simulcast systems would employ status lines directly wired to the master alarm unit, where the current status of the microwave system was logically derived. This method was effective, but severely limited to a hardware design which could not be easily upgraded when additional microwave sites which were added to the loop for future communication system expansion. In addition, the direct wire method could not satisfy the following two conditions: 1) a simulcast system having multiple loops of microwave in the infrastructure, or 2) a single simulcast customer operating multiple systems (i.e., more than one audio source) on multiple loops.

FIG. 1A shows a simplified block diagram of a simulcast transmission system 100. In order for the simulcast network 106 to function properly, the system must be configured so as to account for transmission delays, audio path failures, and the addition and subtraction of repeater sites, some of which are directly coupled to RF transmitter sites, on the system. Today, this configuration process requires that an operator 110 manually adjust the system parameters through the use of user interface 102. The user interface then passes on the new delay parameters and path conditions to the simulcast network, via communication links 104. When problems in the audio path arose, such as broken or damaged communication links 104, the status lines could indicate this new condition to the alarm indicator 108. The condition would then be interpreted, or translated to a human-readable alarm by the alarm indicator 108, alerting the operator 110 to the fact that the system was inoperable. The operator 110 would then have to perform a manual, tedious process to address the new condition and bring the system back to an operational state. This often includes a manual search for a viable audio path which does not traverse the inoperable communication link, or links, which were detected by the alarm indicator 108.

Depending on the size of the simulcast transmission system, the aforementioned task may range from burdensome to nearly impossible. For a single loop system having only one audio source, there are generally only two data sets to consider: those for a clockwise audio path and those for a counter-clockwise audio path. In the same system the number of possible path conditions is equal to the number of repeater sites, or nodes, which may also be a small number (e.g., 3–10). As such, the operator's job of rectifying system problems remains fairly small. On the contrary, in larger, multiple loop systems, the number of alternate path conditions increases dramatically. As such, the simulcast transmission system may be inoperative for an hour or longer, during which time the operator finds himself frantically searching for one audio path which will render the system operational.

An alternate approach to this problem has been to utilize a computer-based polling routine which systematically measures the characteristics of each link in the system and makes equalization adjustments as necessary. This time consuming process, though, often results in the loss of in-process activity, as the system is rendered virtually unusable during these measurement periods. In the event of an emergency call being made through a particular repeater while it is being polled, the audio for that call would be unintelligible, at best; more likely, though, the call is lost altogether. This compromise of public health and safety is viewed as an undesirable, yet predictable, consequence of the polling method.

Accordingly, there exists a dire need for a system which is capable of automatically detecting system audio path problems, and reconfiguring that system to put it back into an operative state in a timely fashion. Additionally, there exists a need for an on-line, automatic audio path map generation scheme which can readily handle changes in system configuration so that system downtime is reduced to a minimum. The human-driven systems currently employed are becoming more inadequate as the simulcast transmission systems become more complex.

SUMMARY OF THE INVENTION

The present invention encompasses a method of automatic path map generation for use in a simulcast transmission system having at least three transmitter sites which form a first communication loop. The first communication loop has at least a first and a second audio path. A first audio path originates from a primary transmitter site, passes first through a first transmitter site, and ends at a second transmitter site. A second audio path originates from the primary site, passes first through the second transmitter site, and ends at the first transmitter site. The first audio path is associated with a first path condition, and the second audio path is associated with a second path condition. The method employed includes establishing a logical representation of the simulcast transmission system. Then, selecting one of the at least three transmitter sites for which a path map is to be generated, determines a logical relationship between the primary transmitter site and the selected transmitter site. Knowing this, the primary site is able to calculate a data set identification (ID) for the selected transmitter site that is associated with each of at least the first and the second path conditions. These data set IDs are then recorded for the selected transmitter site, to produce a path map describing a unique association between each of at least the first and the second path conditions and the data set ID.

BRIEF DESCRIPTION OF THE DRAWINGS

FIG. 1A is a simplified block diagram of a simulcast transmission and maintenance system.

FIG. 1B is a simplified block diagram of a simulcast transmission and maintenance system in accordance with one embodiment of the present invention.

FIG. 3 is a simplified diagram showing coverage and overlap areas for a typical three transmitter simulcast transmission system.

DETAILED DESCRIPTION OF A PREFERRED EMBODIMENT

FIG. 1B shows a simplified block diagram of a simulcast transmission system 150. The system parallels that shown in FIG. 1A, and further includes one embodiment of the present invention as contained in the audio equalization control block 120. The transmission system operates in much the same manner as described above, but has an automatic alarm recovery scheme which virtually alleviates the need for an operator to respond to such alarm indications.

Figure 2A:
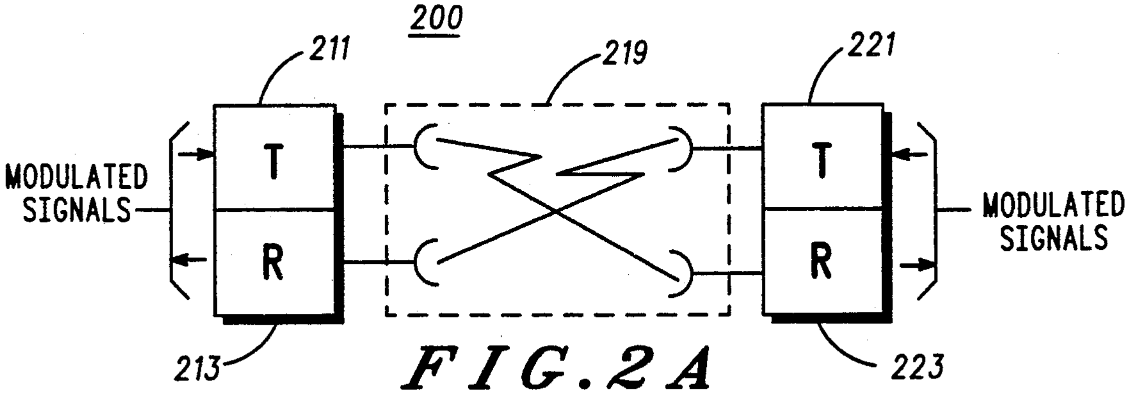
FIG. 2A is a simplified block diagram showing how messages are exchanged between two repeaters in a simulcast transmission system, in accordance with one embodiment of the present invention.
Figure 2B:
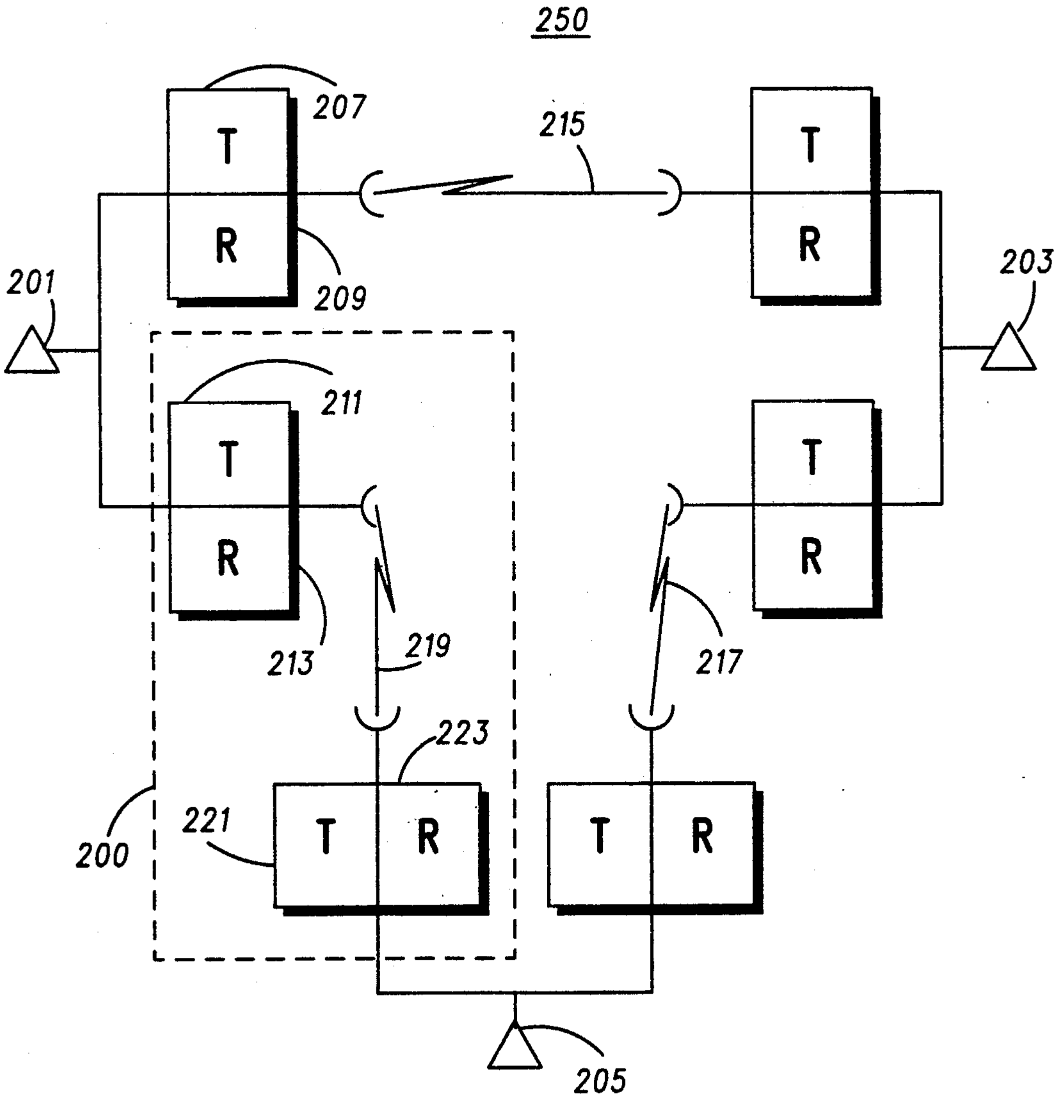
FIG. 2b is a simplified block diagram showing how messages may be exchanged between three repeaters in a single loop simulcast transmission system, in accordance with one embodiment of the present invention.

FIG. 2A shows a typical simulcast transmission link 200. Modulated signals, or messages, are exchanged between two sites, or repeaters, via communication link 219. In a preferred embodiment of this invention, communication link 219 comprises two microwave links, allowing a bi-directional exchange between the two sites. Microwave technology is employed to take advantage of the reliability and inherent stability of this high frequency methodology. Alternate embodiments may include fiber optic links or any other such radio technology which meets the required specifications of a simulcast transmission system. Referring again to FIG. 2A, microwave transmitter 211 sends modulated signals to receiver 223, while microwave transmitter 221 sends modulated signals to receiver 213. Expanding on the idea set forth in FIG. 2A, FIG. 2B shows a simple microwave loop communication system 250. Repeater 201 is able to communicate with repeaters 203 and 205, via communication links 215 and 219, respectively. Similarly, repeater 203 communicates with repeater 201 and 205, via communication links 215 and 217, respectively. In this manner, modulated signals can be exchanged between the three sites in a bi-directional fashion such that there is a continuous audio path between any two sites, even if one of the communication links become inoperative.

Figure 2C:
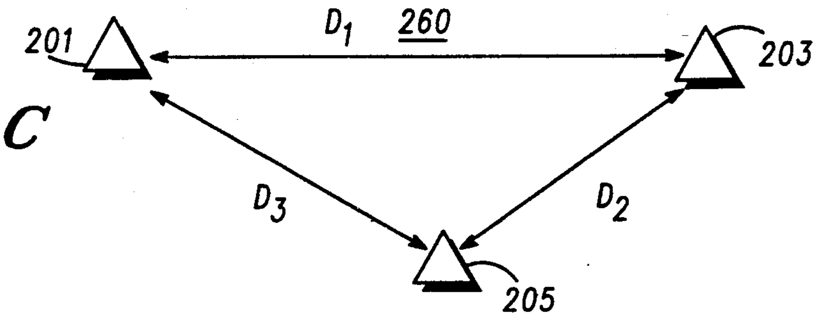
FIGS. 2C–2F are simplified diagrams showing the possible audio paths for the system of FIG. 2B, in accordance with one embodiment of the present invention.

FIGS. 2C–2F show the possible audio path configurations in the three site loop shown in FIG. 2B. In FIG. 2C, arrangement 260 shows all the possible bi-directional links between the three repeater sites 201, 203, and 205. When exchanging signals between sites 201 and 203, a propagation time delay D1 is experienced. Similarly, exchanging information between sites 201 and 205, a propagation time delay of D3 is experienced. Lastly, exchanges between sites 203 and 205 present a propagation time delay equivalent to D2. It should be noted that, even in a small loop system, the communication links are normally configured such that at least one communication link is purposely "severed", rendering it inactive. This is generally the case so that the high speed information being exchanged does not exhibit characteristics of undesired oscillation in the closed loop path. Under "normal" conditions (as set forth later in this section), the "severed" link is generally that which is first in a counter-clockwise path originating from the audio source.

Figure 2D:
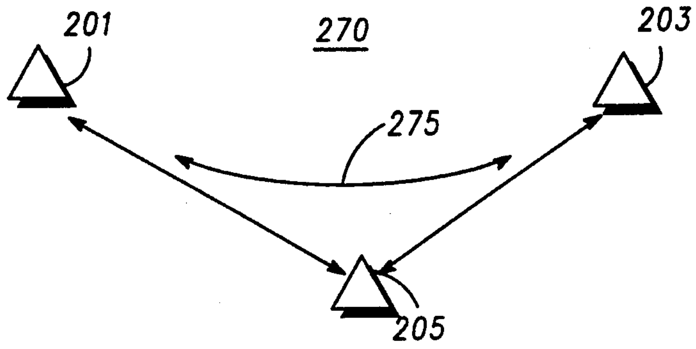
Figure 2E:
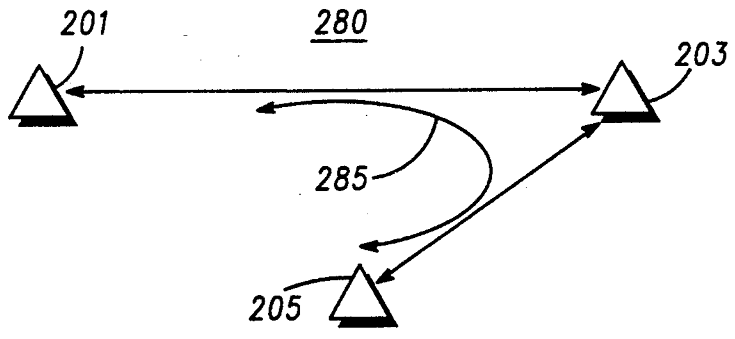
Figure 2F:
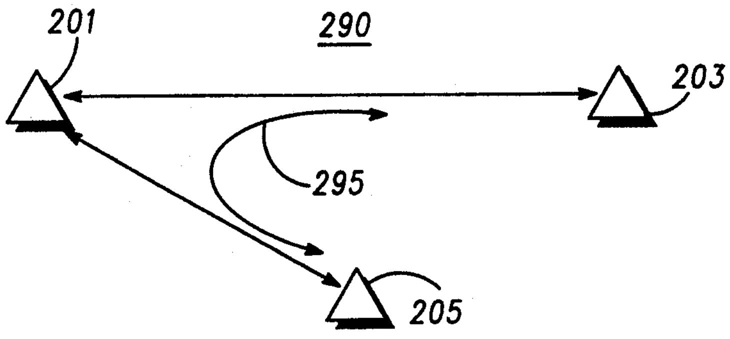

The term "audio source" hereinafter shall refer to the one or more repeaters in the system which are responsible for receiving, via the communication links which make up the infrastructure, the incoming audio from an originating device (e.g., a subscriber unit transmitting audio to one of the sites within the system, which is then relayed to the audio source). Once the audio input is received, the audio source, or primary site, modulates the information and broadcasts it, via these same communication links, to the transmitter sites (i.e., repeaters dedicated to RF transmission of the information to communication units in their coverage area). For the simple system shown in FIGS. 2D–2F, assume that repeater 201 is the audio source and that repeaters 203 and 205 are transmitting sites. Referring to FIG. 2D, arrangement 270 shows primary site 201 broadcasting audio information to sites 205 and 203, via a counter-clockwise audio path 275. In such an arrangement, transmitter site 203, being the last of the transmitter sites to receive the information, does not require any delay before transmitting the information (i.e. as soon as it is received and demodulated, the audio is transmitted). On the contrary, site 205 must delay a time equal to D2 before transmitting, so that the information has time to arrive at site 203 before the simultaneous transmission from the two sites. Similarly, site 201 must add a time delay equal to the sum of D3 and D2 in order to simultaneously transmit this information with the other sites. Arrangement 280 in FIG. 2E shows a clockwise audio path 285, which may be required if the link between site 201 and 205 becomes damaged, or otherwise inoperable. This arrangement is considered the "normal" operating mode for a given loop. In this case, site 205, being the last receiving transmitter site, does not require a time delay. Analogous to arrangement 270 described above, site 203 requires a time delay equal to D1, and site 201 requires a time delay equal to the sum of D1 and D2. Under these conditions, the transmitted information is transmitted simultaneously among the three sites. Arrangement 290, shown in FIG. 2F, arises, for example, when the link between site 203 and 205 becomes inoperable. In this case the audio source 201 must first determine the relationship between time delays D1 and D3. The delay parameters, or data sets, chosen for this arrangement greatly depend on this relationship. If D3 is greater than D1, for example, the following delays are required. Transmitter site 205, since it is the maximum distance away from site 201, requires no propagation time delay. Transmitter site 203 requires a time delay equivalent to the difference between delay D3 and delay D1. Transmitter site 201 requires a time delay equal to the longer of the two delays, or D3. Audio path 295 shows this bi-directional broadcast originating from audio source 201.

Delay parameters, or data sets, are uploaded at each of the transmitting repeater sites each time the system configuration changes. This audio equalization recovery takes place, without human inputs, and hence is not subject to human error. It should be noted that this recovery scheme utilizes a single message broadcast of a path condition to all sites, offering a great advantage over the time-intensive polling technology. This path condition is associated with a unique data set, which includes the required delay parameters for that site. Compare this real time system recovery (requiring on the order of 250 micro-seconds) to that of todays system which sends the manually-derived delay parameters, individually, to each transmitter site in the system.

FIG. 3 shows a typical simulcast transmission system coverage map 300. Transmitting sites 302, 304, and 306 are shown propagating RF signals about their respective coverage areas. Coverage area 308 represents the coverage area for transmitter site 302. Similarly, coverage areas 310 and 312 represent the coverage areas for transmitter sites 304 and 306, respectively. Overlap area 314 represents the geographical location in which the signals received from transmitter sites 304 and 302 are approximately equal in strength. Likewise, overlap area 316 represents that area receiving RF signals from transmitter sites 302 and 306 having approximately equal signal strengths. Overlap area 318 represents that small area in the overall coverage area that receives RF signals from all three transmitter sites with approximately equal signal strengths. All of these overlap areas require a simultaneous reception (e.g., within ±2.5 microseconds) of signals from the transmitting sites in order for the received audio to be intelligible.

Figure 4:
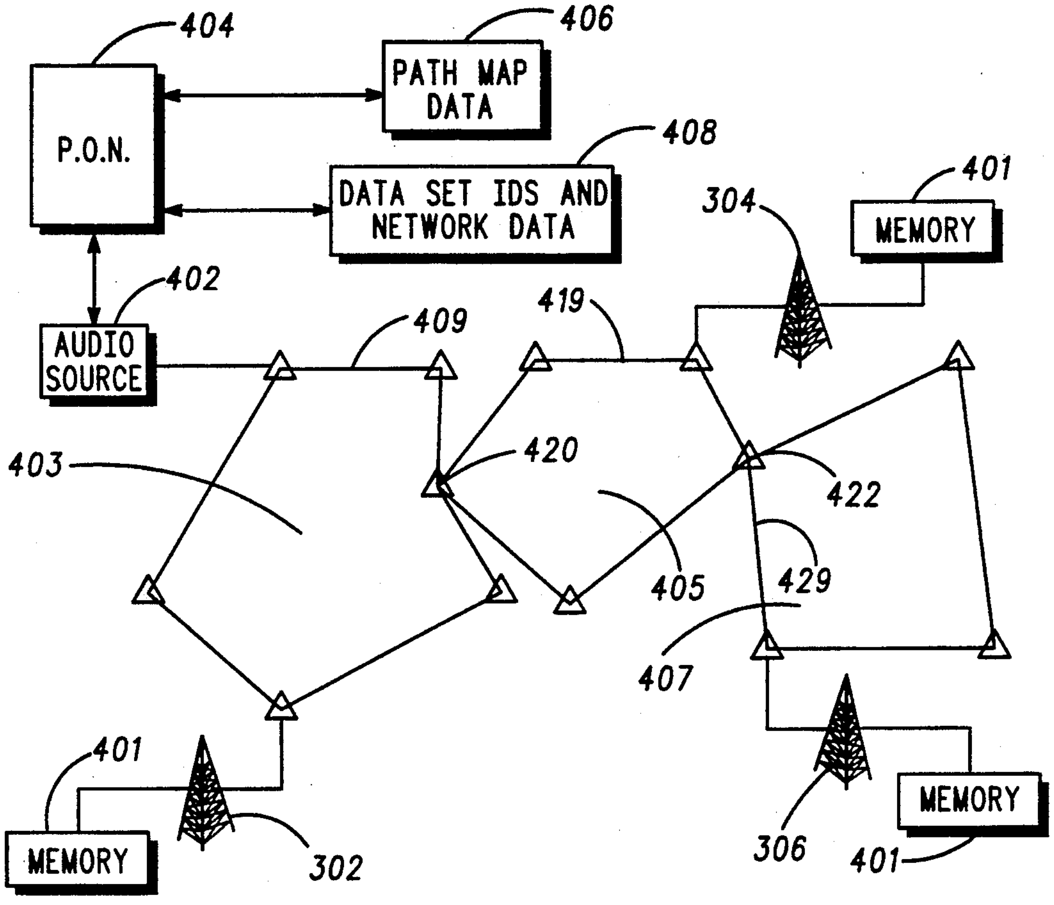
FIG. 4 is a simplified representation of a simulcast transmission system having a microwave infrastructure and audio equalization control, in accordance with one embodiment of the present invention.

FIG. 4 shows a simplified representation of a simulcast transmission system 400 having components present in a preferred embodiment of the invention. Shown are transmitter sites 302, 304 and 306 as they appear in FIG. 3, coupled, via a microwave infrastructure, to an audio source and to each other. Audio source 402 receives audio signals (e.g., via the infrastructure, from a mobile or portable radio), modulates the signals, and broadcasts them to the transmitting sites 302, 304, 306. Doing so requires that the audio source 402 know the operating status of the infrastructure (i.e. communication links) in the system. To handle this task, the audio source 402 is coupled to a simulcast network master control device. In one embodiment, this device is called a prime optimization network (P.O.N.) 404 which detects and keeps track of all possible path conditions in the system. The P.O.N. 404 may be configured from a simple personal computer, such as an IBM model 55SX, a mainframe, or any custom computing device designed for this purpose. Path map data, which describes the association between path conditions and required data sets, for the audio source 402 resides in data block 406. The data sets, or delay parameters, required for each RF transmitter resides, along with their associated path conditions, in data block 408. Also in data block 408 are the network data parameters, such as the number of loops, number of repeaters, or nodes, in each loop, number of audio sources, etc. Note that the transmitter sites 302, 304, and 306 all contain a memory block 401, which hold the data sets pertinent to that transmitter site and for each possible path condition (i.e. path map). Furthermore, memory block 401 may also contain amplitude correction data which is used to adjust the amplitude of received signals based on the path in which they were broadcast. Having this data stored in a resident manner (i.e., in memory block 401 at each site) the individual transmitter site requires only the receipt of a single path condition, which may be encoded in a predetermined way, in order to configure itself for proper operation.

Referring again to FIG. 4, the system shown is commonly referred to as a three loop microwave system. The term "loop" refers to a bi-directional, closed-path (though, in practice, each loop has at least one link intentionally "broken") infrastructure. In a preferred embodiment of the invention, such a system comprises microwave links between all repeaters within each loop. Some, but not all, of these repeaters are used as transmitting sites, such as transmitting site 302. Other repeaters are simply used to receive and transmit information bi-directionally to adjacent transmitter sites, for example to avoid mountainous regions or urban building structures within the coverage area. It is further noted that each repeater may have multiple transmitter sites coupled to it, which may operate at different frequencies and/or use different audio sources. Such configurations serve to greatly magnify the system maintenance problem, allowing still greater chance for human error.

In the case of the actual audio source being outside of a particular loop, such as audio source 402 in loop 403, and with respect to loop 405, the common repeater 420, linking loop 403 and loop 405, serves as a "virtual" audio source for loop 405. The term "virtual" is used since, from the perspective of the repeaters in loops outside of that which has the audio source, the actual origin of the audio signal is unimportant All information, in effect, originates from the common repeater linking a loop to a loop closer to, or containing, the audio source. Similarly, repeater 422 acts as a virtual audio source for loop 407, since it is also part of a loop closer to the actual audio source. Paths originating from a primary site (i.e., either an actual audio source 402 or a virtual audio source 420, 422) can only be sourced in two direction; clockwise and counter-clockwise. As such, it can be seen that for an n-loop system, there are $2^n$ possible data sets required for each site To illustrate this, audio information exchanged between audio source 402 and a transmitter site 306 will be shown along various paths, depending on the status of the infrastructure linking these two sites. Initially, assume that the audio path originates from audio source 402 in a clockwise ("normal") direction, such that communication link 409 is the first link traversed in the audio path for loop 403. Repeater 420, acting as a virtual audio source for loop 405, is similarly configured to exchange information around loop 405 in a clockwise (again, "normal") direction. Lastly, loop 407 receives the information via a counter-clockwise ("non-normal") audio path originating from virtual audio source 422. It will later be shown how this configuration (clockwise/clockwise/counter-clockwise) results in a data set ID of "001". In this manner, transmitter site 306 receives the information from audio source 402 and, using the data set ID associated with that particular path condition, is able to inject the proper delay values before transmitting the information to its coverage area. Assume that communication link 429 then becomes inoperative, rendering the counter clockwise path of loop 407 inadequate for allowing transmitter site 306 to receive the audio information. Sensing this through the use of the alarm indicator 108, the P.O.N. 404 is able to recreate a logical representation of a viable (i.e. operational) audio path and, using the information stored in data blocks 406 and 408, regenerate the path condition. This path condition is then sent, in a single message broadcast, to all RF transmitters in the system. The delay parameters are then uploaded from memory 401 into the respective transmitter sites, including site 306, according to the associated path condition. Since the path between the audio source 402 and transmitter sites 302, and 304 remains unchanged, the delay parameters for these sites do not change. Similarly, if communication link 419 becomes inoperable, repeater 420 redirects its audio path from a clockwise direction in order to alleviate reliance upon communication link 419 for exchanging information among the sites in loop 405.

Due to the limited number of sites shown in FIG. 4, the problem of choosing the proper delay parameters for redirected audio paths between nodes appears to be a trivial one which may be handled by a human operator. In reality, however, such systems are far more complex and require the hands-on expertise of many technicians in order to maintain such a complex system. It can be shown that for an n loop system, with loop i having $K_i$ separate nodes, the maximum number of unique path conditions is given by the equation:

$$\text{Unique Path Conditions} = \prod_{i=1}^{n} K_i$$

Furthermore, the total number of possible path map combinations can be shown to range from the expression given above to a much larger number given by the expression:

$$\text{Max Number of Path Maps} = \{(2^n)!\} \times \prod_{i=1}^{n} K_i!$$

Where $2^n$ is the minimum number of data sets required for an n-loop system. This is the case since, in practice, there are many possible choices among viable audio paths, each of which can result in a different path map for different transmitter sites. Most of these, however, are unnecessary, since the actual physical change in the system effects only a limited number of transmitter sites. As such, it is not necessary to generate a new path map for those unaffected sites. Depending on the skill of the technician deriving the path maps, this may require a great deal of time. Accordingly, one embodiment of the invention addresses this problem by first reducing the number of path map entries to the maximum number of unique path conditions, and then calculating a unique data set ID which "maps" the proper data sets to the present path condition. Hence, by automating this process, not only does the reliability of the system dramatically increase, the required maintenance of the system dramatically decreases, yielding a substantial cost savings. Additionally, by using a single message broadcast approach, there is great time savings between communication link failure and bringing the system back to an operational state. This can all be done, in real time, without the intervention of an operator or technician.

Figure 5:
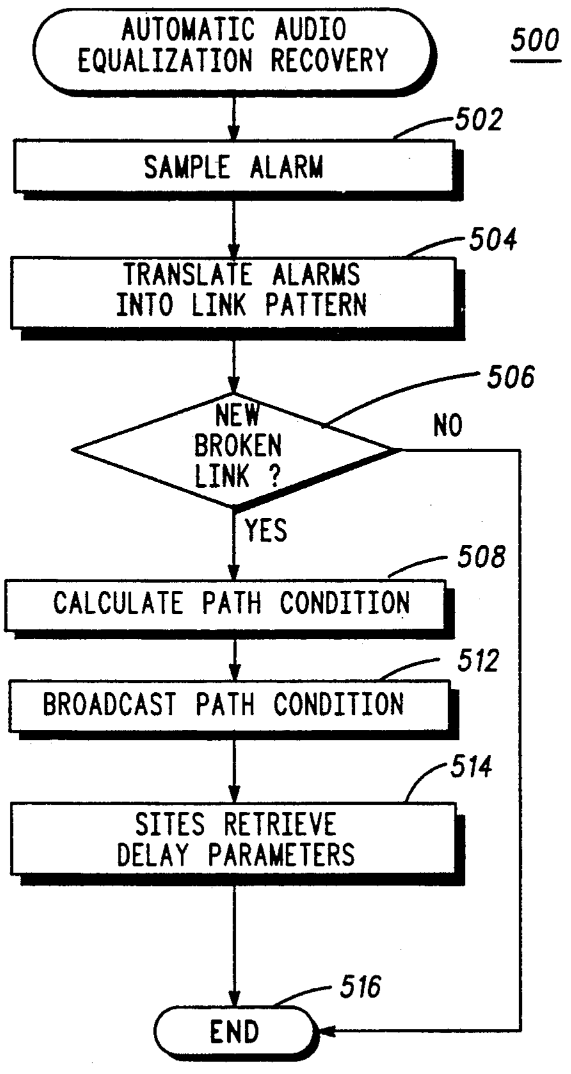
FIG. 5 is a simplified flow diagram depicting the operations governing the automated audio equalization recovery scheme, in accordance with one embodiment of the present invention.

FIG. 5 shows an automatic audio equalization scheme 500 in accordance with one embodiment of the present invention. The P.O.N. 404 samples the microwave alarms at 502. These alarms are then translated by the P.O.N. at 504 and put into a broken (i.e., failed) link pattern. This link pattern is compared to a previously stored word pattern at 506 to determine whether or not a new link in the system has been broken (i.e., become inoperable). If no new links are broken the routine is exited at 516. If the alarm detects that a new link has been broken, it is implied that there has been a change in the physical status of the microwave network. To remedy this condition, the P.O.N. uses the new broken link pattern to calculate the correct path condition at 508. With the common repeater sites having been redirected to accommodate the physical changes in the system, the new path condition is broadcast at 512 to all the transmitter sites. After receiving the message, each of the transmitter sites then retrieve at 514 the appropriate delay parameters associated with that path condition before exiting the routine at 516.

Figure 6:
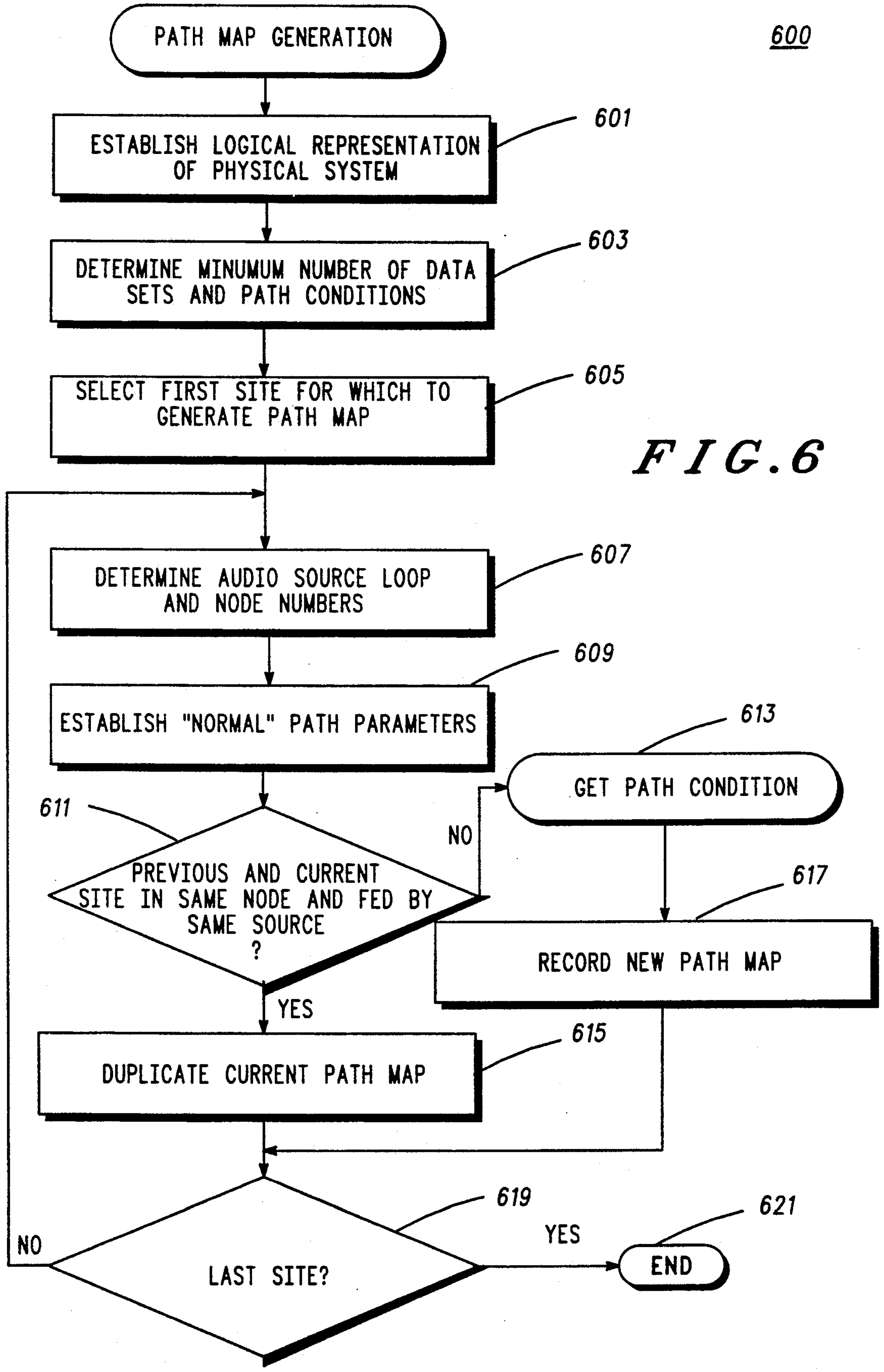
FIG. 6 is a simplified flow diagram depicting the path map generation scheme in accordance with one embodiment of the present invention.

FIG. 6 shows a path map generation scheme 600 in accordance with one embodiment of the present invention. The routine begins when the P.O.N. 404 establishes at 601 a logical representation of the physical simulcast transmission system. Simply put, this includes the assignment of a unique identification for each transmitter site, node, and loop in the system. The minimum number of data sets and path conditions are then determined at 603 for the current system configuration. As mentioned previously, the minimum number of data sets is represented by $2^n$ and the minimum number path conditions is equal to the product of the number of nodes in each respective loop. A particular transmitter site is then selected at 605 for which to generate the path map. This is generally the site which is located furthest from the audio source in a single audio source system, but may be chosen arbitrarily. Once the site has been selected, the loop and node numbers for the audio source feeding that site is determined at 607. The normal audio path parameters are then established at 609, wherein normal refers generally to a clockwise traversal of information within the loop. In a two loop microwave system, for example, the "normal" path parameters would be established as "clockwise, clockwise", which may be assigned a path condition of binary "00". The decision is made at 611 which determines whether or not the previous and current site are located in the same node and fed by the same source. If they are, the current path map is duplicated at 615 before moving on to the next site. This implies that all transmitter sites which are physically coupled to the same microwave node, or repeater, and are fed by the same audio source, have path maps which are identical. If the previous and current site are not in the same node and/or fed by the same source, the routine attempts to establish the new path condition using subroutine 613 before recording the new path map at 617. A decision is then reached at 619 to determine whether or not all sites in the system have been given new path maps. If not, the loop and node numbers for another site are established and the routine loops back to the point where the audio source loop and node numbers are determined at 607. If all sites in he system have been considered, the routine is then exited at 621.

Figure 7:
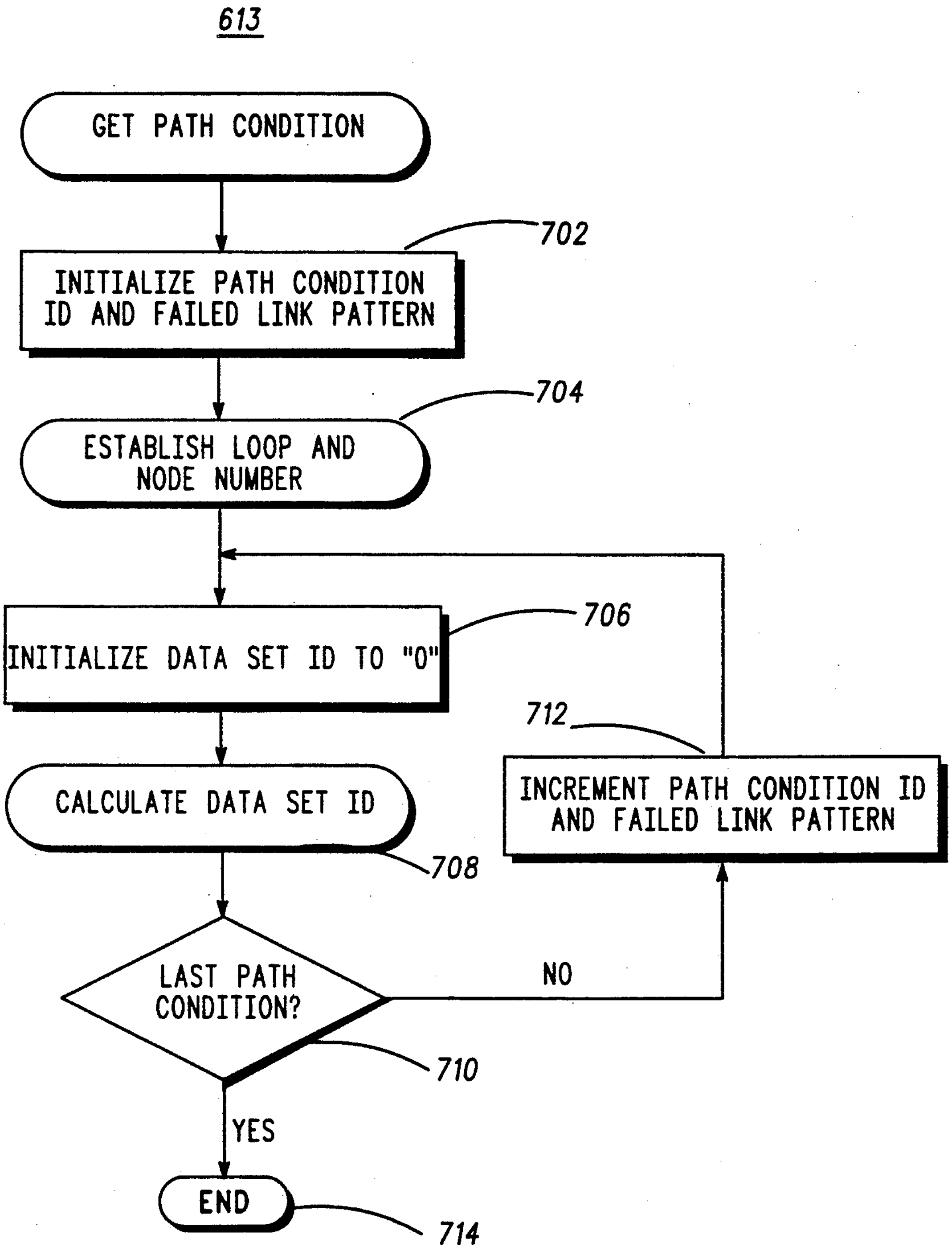
FIG. 7 is a simplified flow diagram depicting a functional decomposition of the "Get Path Condition" subroutine shown in FIG. 6.

FIG. 7 shows a functional decomposition of subroutine 613 which is used to derive a unique path condition ID for each possible path condition in the system. To do this, a failed link pattern is used, which is the analogous alarm input during real time processing in the system. Subroutine 613 begins when the path condition IDs and failed link patterns are initialized at 702. The routine then branches then to subroutine 704 in order to establish the loop and node numbers for this particular site. The data set ID is then initialized at 706 to a value of a "0". This is so that the default condition for a given audio path is clockwise for all loops in the system. Of course, for a three loop system, the initialized value would be "000". The routine then branches to subroutine 708 where the actual data set ID is calculated. A decision is then reached at 710 which determines whether or not the last path condition has been considered. If not the path condition ID and failed link patterns are incremented at 712 and the routine loops back to the point where the data set ID is initialized at 706. If all path conditions have been considered, the routine is exited at 714.

Figure 8:
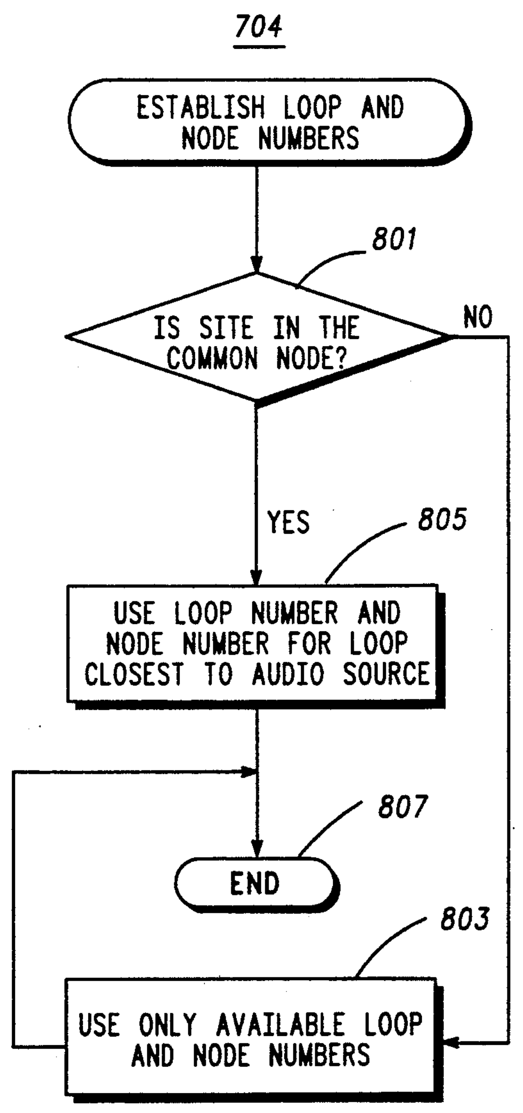
FIG. 8 is a simplified flow diagram depicting a functional decomposition of the "Establish Loop and Node Numbers" subroutine shown in FIG. 7.

FIG. 8 shows a functional decomposition of subroutine 704, which is used to establish the loop and node numbers for the chosen site. A decision is first reached at 801 where it is determined whether or not the site is in a common node between loops and a multiple loop system. If not, there is only one unique loop and node number associated with this site, and it is this set of identifying parameters which is assigned to the current site at 803. If the site is coupled to a common node then the routine must chose between two available loop/node number combinations for that site. The routine assigns at 805 the loop number and node number associated with that loop closest to the audio source which is determined at 607. The routine is then exited at 807.

Figure 9:
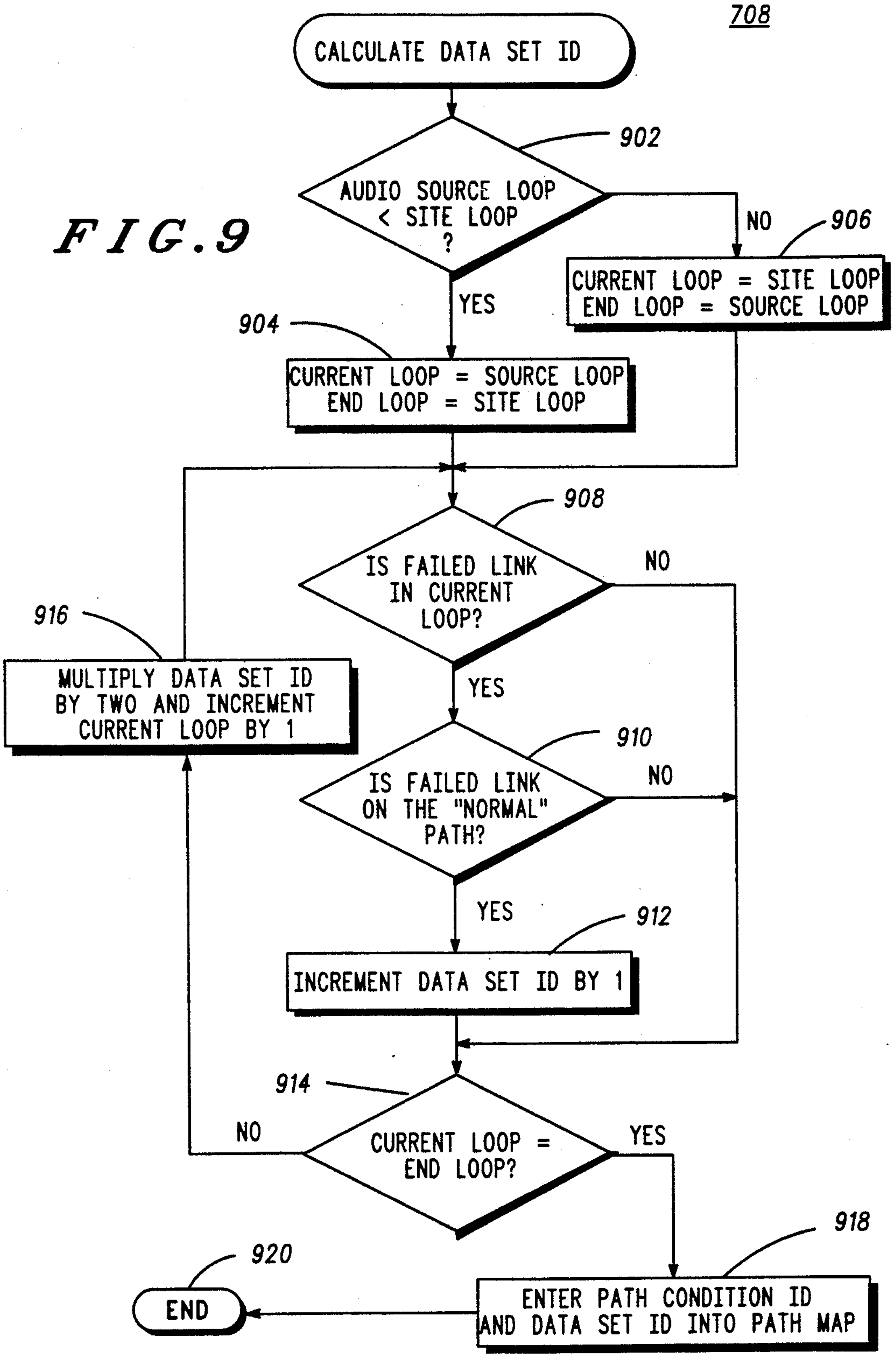
FIG. 9 is a simplified flow diagram depicting a functional decomposition of the "Calculate Data Set ID" subroutine shown in FIG. 7.

FIG. 9 shows a functional decomposition of the subroutine 708, which is used to calculate the actual data set ID to be used for a particular path condition. A decision is reached at 902 to determine whether or not the audio source loop number is less than the current site loop number. If not, the current loop is set equal to the site loop and the end loop is set equal to the source loop at 906. Under these conditions, the site is either in the same loop as the audio source or is located in a loop which is upstream from the audio source "e.g. in FIG. 4, loop 403 is considered upstream of loops 405 and 407". If the audio source loop number is less than the site loop number, the current loop is set equal to the source loop and the end loop is set equal to the site loop at 904. Under these conditions, the site being considered is located downstream from the audio source. Also, there is no need to consider those loops which are downstream of the loop containing the site which is being considered for purposes of determining the path condition and associated data set ID. A decision is then reached at 908 where it is determined if the failed link is in the current loop. If not, the routine jumps down to decision 914, which is later described. If the failed link is located in the current loop then a decision is reached at 910 which determines whether or not the failed link is on the "normal" path between the audio source and this transmitter site. If not, the routine again loops to decision 914. if the failed link is on this normal path, then the routine increments at 912 the data set ID by 1. A decision is then reached at 914 to determine whether or not the current loop is the last loop to be considered. If it is, the path condition ID and the data set ID are then entered into the path map at 918 and the routine is exited at 920. If there are other loops to consider, the routine then multiplies the data set ID by 2 "i.e., binary shift left" and increments a current loop by one at 916. The routine then loops back to decision 908 to establish the applicable path direction for the next loop. It is to be noted that for an N loop system the data set ID consists of a N bit number, where each binary number represents the clockwise "0" and counter clockwise "1" path directions for that loop. In this way, a unique, minimum solution set is obtained for all possible path conditions arising in the system.

What is claimed is:

1. A method of automatically mapping delay parameters with particular path conditions, the method being employed in a network control device of a simulcast transmission system having at least three transmitter sites which form a first communication loop having at least a first and a second audio path, the first audio path originating from a primary transmitter site, passing first through a first transmitter site, and ending at a second transmitter site, a second audio path originating from the primary site, passing first through the second transmitter site, and ending at the first transmitter site, the first audio path being associated with a first path condition, the second audio path being associated with a second path condition, the method comprising the steps of:

selecting one of the at least three transmitter sites for which a path map is to be generated to produce a selected transmitter site;

determining a logical relationship between the primary transmitter site and said selected transmitter site;

calculating, based on said logical relationship, a data set identification (ID) containing delay parameters for said selected transmitter site and associated with each of the at least first and the second path conditions; and recording said data set ID for said selected transmitter site, whereby a path map describing a unique association between each of at least the first and the second path conditions and said data set ID is produced.

2. A method of automatic path map generation in accordance with claim 1, further comprising the step of broadcasting said path map to at least the first and the second transmitter sites.

3. A method of automatically mapping delay parameters with particular path conditions, the method being employed in a network control device of a simulcast transmission system having at least a primary, a first, and a second transmitter site which are coupled, via communication links, to form a first communication loop, the first communication loop being coupled to a second communication loop via a common transmitter site among the first and the second communication loop, the second communication loop having at least a third and a fourth transmitter site, a first audio path originating from the primary transmitter site, passing first through the first transmitter site, through the common transmitter site, then passing through the third transmitter site, a second audio path originating from the primary transmitter site, passing first through the first transmitter site, through the common transmitter site, then passing through the fourth transmitter site, a third audio path originating from the primary transmitter site, passing first through the second transmitter site, through the common transmitter site, then passing through the third transmitter site, a fourth audio path originating from the primary transmitter site, passing first through the second transmitter site, through the common transmitter site, then passing through the fourth transmitter site, each of the first, second, third, and fourth audio paths being associated with a path condition, the method comprising the steps of:

determining, based on said logical representation, a minimum number of possible path conditions for the simulcast transmission system;

selecting one of the transmitter sites for which a path map is to be generated to produce a selected transmitter site;

determining a logical relationship between the primary transmitter site and said selected transmitter site;

calculating, based on said logical relationship, a data set identification (ID) containing delay parameters for said selected transmitter site and associated with each of the at least the first, second, third, and fourth path conditions; and recording said data set ID for said selected transmitter site, whereby a path map describing a unique association between each of at least the first, second, third, and fourth path conditions and said data set ID is produced.

* * * * *